US012606182B2

(12) United States Patent
Miyazaki et al.

(10) Patent No.: US 12,606,182 B2
(45) Date of Patent: Apr. 21, 2026

(54) VEHICLE AND METHOD OF EVALUATING PERFORMANCE OF AUTONOMOUS DRIVING DEVICE

(71) Applicant: TOYOTA JIDOSHA KABUSHIKI KAISHA, Toyota (JP)

(72) Inventors: Sei Miyazaki, Susono (JP); Sho Hashimoto, Susono (JP); Kazunori Nakano, Fujinomiya (JP); Satoshi Nakamura, Sunto-gun (JP); Noriaki Hasegawa, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/380,347

(22) Filed: Oct. 16, 2023

(65) Prior Publication Data
US 2024/0149891 A1 May 9, 2024

(30) Foreign Application Priority Data
Nov. 8, 2022 (JP) ................................. 2022-179005

(51) Int. Cl.
*B60W 50/02* (2012.01)
*B60W 60/00* (2020.01)

(52) U.S. Cl.
CPC .... *B60W 50/0205* (2013.01); *B60W 60/0015* (2020.02); *B60W 2050/021* (2013.01); *B60W 2556/50* (2020.02)

(58) Field of Classification Search
CPC ......... B60W 50/0205; B60W 60/0015; B60W 2050/021; B60W 2556/50; B60W 2520/14; B60W 2556/45; B60W 2756/10; B60W 50/04; B60W 60/00186; B60W 60/001; G01M 17/007
See application file for complete search history.

(56) References Cited

U.S. PATENT DOCUMENTS

| | | | |
|---|---|---|---|
| 8,977,499 B1 | 3/2015 | Prokhorov et al. | |
| 9,507,346 B1 * | 11/2016 | Levinson | G06F 3/04847 |
| 10,431,023 B1 * | 10/2019 | Watson | G05D 1/0088 |
| 11,964,670 B1 * | 4/2024 | Van Alsenoy | G01C 21/3837 |
| 2018/0339712 A1 * | 11/2018 | Kislovskiy | H04L 67/34 |
| 2019/0049948 A1 * | 2/2019 | Patel | G05D 1/0027 |

(Continued)

FOREIGN PATENT DOCUMENTS

| | | |
|---|---|---|
| JP | 2009-064088 A | 3/2009 |
| JP | 2010-143387 A | 7/2010 |

(Continued)

*Primary Examiner* — Sze-Hon Kong
(74) *Attorney, Agent, or Firm* — Oliff PLC

(57) ABSTRACT

A vehicle includes: a travel state sensor configured to acquire information about a travel state of the vehicle; one or more processors; and a memory connected to the one or more processors and storing a plurality of instructions to be executed by the one or more processors. The instructions are configured to cause the one or more processors to: communicate with an autonomous driving device configured to calculate a target track for the vehicle; subject the vehicle to automated travel in accordance with the target track received from the autonomous driving device; and calculate an evaluation value of performance of the autonomous driving device based on the information acquired by the travel state sensor.

10 Claims, 6 Drawing Sheets

(56) References Cited

U.S. PATENT DOCUMENTS

| | | | |
|---|---|---|---|
| 2019/0064823 A1 | 2/2019 | Jiang et al. | |
| 2019/0354111 A1* | 11/2019 | Cheng | G05D 1/0011 |
| 2020/0180614 A1 | 6/2020 | Goto et al. | |
| 2020/0391765 A1* | 12/2020 | Jia | B60W 60/001 |
| 2021/0107521 A1 | 4/2021 | Fujita et al. | |
| 2021/0107528 A1 | 4/2021 | Fujita et al. | |
| 2021/0116907 A1* | 4/2021 | Altman | B60W 50/04 |
| 2021/0146956 A1 | 5/2021 | Fujita et al. | |
| 2021/0146958 A1 | 5/2021 | Tanaka et al. | |
| 2021/0245806 A1 | 8/2021 | Suzuki et al. | |
| 2021/0339762 A1 | 11/2021 | Yee | |
| 2021/0394794 A1 | 12/2021 | Gyllenhammar et al. | |
| 2022/0268904 A1* | 8/2022 | Zhao | G01S 7/40 |
| 2022/0281478 A1 | 9/2022 | Shedge et al. | |
| 2023/0093126 A1* | 3/2023 | Yehoshua | G06F 11/3696 |
| | | | 701/26 |
| 2023/0236317 A1* | 7/2023 | Fina | G01S 7/412 |
| | | | 342/26 B |
| 2023/0289281 A1* | 9/2023 | Redford | G06F 11/3698 |
| 2023/0292243 A1* | 9/2023 | Mueck | H04W 52/0216 |
| 2023/0311951 A1* | 10/2023 | Kobayashi | B60S 1/0818 |
| | | | 701/23 |
| 2023/0322259 A1* | 10/2023 | Sadek | G01C 21/32 |
| | | | 701/23 |
| 2023/0391250 A1* | 12/2023 | Hsu | F21S 41/13 |
| 2023/0406362 A1* | 12/2023 | Jiang | G01M 17/007 |
| 2024/0036575 A1 | 2/2024 | Kosaka et al. | |
| 2024/0116492 A1* | 4/2024 | Filipenko | B60W 60/0025 |
| 2024/0149923 A1* | 5/2024 | Fang | G06V 20/56 |
| 2024/0419572 A1* | 12/2024 | Whiteside | G06F 11/3698 |

FOREIGN PATENT DOCUMENTS

| | | |
|---|---|---|
| JP | 2015-103257 A | 6/2015 |
| JP | 2019-043192 A | 3/2019 |
| JP | 2021-062780 A | 4/2021 |
| JP | 2021-123146 A | 8/2021 |
| JP | 2021-175635 A | 11/2021 |
| WO | 2022/149308 A1 | 7/2022 |
| WO | 2022/168672 A1 | 8/2022 |

* cited by examiner

VEHICLE AND METHOD OF EVALUATING PERFORMANCE OF AUTONOMOUS DRIVING DEVICE

CROSS-REFERENCE TO RELATED APPLICATION

This application claims priority to Japanese Patent Application No. 2022-179005 filed on Nov. 8, 2022, incorporated herein by reference in its entirety.

BACKGROUND

1. Technical Field

The present disclosure relates to a vehicle capable of autonomous driving and a method of evaluating the performance of an autonomous driving device that provides a vehicle with an autonomous driving function.

2. Description of Related Art

Japanese Unexamined Patent Application Publication No. 2021-123146 (JP 2021-123146 A) discloses a vehicle configured to perform autonomous driving in accordance with a command from an autonomous driving kit (ADK) removably mountable on the vehicle. The vehicle includes an interface box (VCIB) that receives a command from the ADK. The VCIB provides a control command to functional sections of the vehicle, including a steering system, in accordance with a command for autonomous driving from the ADK.

Japanese Unexamined Patent Application Publication No. 2021-062780 (JP 2021-062780 A) discloses a vehicle control system that includes a first unit that generates a target trajectory based on a travel plan for a vehicle and a second unit that executes vehicle travel control such that the vehicle follows the target trajectory. The second unit is provided with a function to calculate a travel control amount based on the target trajectory and a function to interfere with the travel control amount in order to suppress the occurrence of a collision between the vehicle and an obstacle.

SUMMARY

In a related art (first related art) disclosed in JP 2021-123146 A, commands sent from the ADK to the vehicle affect the autonomous driving performance of the vehicle. That is, the autonomous driving performance of the vehicle depends on the performance of the ADK. However, the ADK is a device that is independent of the vehicle, and may be developed by a developer that is different from the developer of the vehicle. Therefore, the true performance of the ADK is not necessarily open to the vehicle, unlike devices developed together with the vehicle. Even if the performance of the ADK according to the specifications is open to the vehicle, meanwhile, variations in the performance of the ADK due to abnormalities of the ADK may not be open to the vehicle.

The above issue also holds true for a related art (second related art) disclosed in JP 2021-062780 A. While the second unit is a system integrated with the vehicle, the first unit can be configured as a device that is independent of the vehicle and removably mountable on the vehicle. That is, the first unit may be developed by a developer that is different from the developer of the second unit. The autonomous driving performance of the vehicle depends on the performance of the first unit that generates a target track. When the first unit is constituted as an external device, however, the true performance of the first unit is not necessarily open to the vehicle, in particular to the second unit.

An autonomous driving system provided on an autonomous driving vehicle to perform autonomous driving makes a travel plan including a target track, and controls travel of the vehicle according to the travel plan. The two related arts described above provide systems in which a subject that makes a travel plan for autonomous driving and a subject that controls travel of a vehicle in accordance with the travel plan are provided independently of each other. In such systems, the subject that controls travel of the vehicle ultimately secures the safety of the vehicle itself, and secures the safety of objects around the vehicle including pedestrians. When the performance of the subject that makes a travel plan is not open to the subject that controls travel of the vehicle, however, the subject that controls travel of the vehicle may not be able to perform adequate control for securing safety.

The present disclosure provides a vehicle that allows a subject that controls travel of the vehicle to grasp the performance of a subject that makes a travel plan when the subject that makes a travel plan for autonomous driving is independent of the subject that controls travel of the vehicle in accordance with the travel plan.

The vehicle provided by the present disclosure includes a first vehicle and a second vehicle.

The first vehicle according to the present disclosure is configured to communicate with an autonomous driving device provided independently of the vehicle and receive a target track for the vehicle calculated by the autonomous driving device. The autonomous driving device corresponds to a "subject that makes a travel plan for autonomous driving" that is independent of a subject that controls travel of the vehicle. The autonomous driving device may be removably mounted on the vehicle, or may be provided on a communication network and connected to the vehicle through wireless communication.

A first aspect of the present disclosure provides a vehicle including: a travel state sensor configured to acquire information about a travel state of the vehicle; one or more processors; and a memory connected to the one or more processors and storing a plurality of instructions to be executed by the one or more processors, in which the instructions are configured to cause the one or more processors to: communicate with an autonomous driving device configured to calculate a target track for the vehicle; subject the vehicle to automated travel in accordance with the target track received from the autonomous driving device; and calculate an evaluation value of performance of the autonomous driving device based on the information acquired by the travel state sensor.

The second vehicle according to the present disclosure is configured to calculate a target track for the vehicle using an autonomous driving application that is provided inside the vehicle independently of other applications. The autonomous driving application corresponds to a "subject that makes a travel plan for autonomous driving" that is independent of a subject that controls travel of the vehicle.

A second aspect of the present disclosure provides a vehicle including: a travel state sensor configured to acquire information about a travel state of the vehicle; one or more processors; a first memory connected to the one or more processors and storing a plurality of instructions that is executable by the one or more processors; and a second memory connected to the one or more processors and storing an autonomous driving application that calculates a target track for the vehicle, in which the instructions are configured to cause the one or more processors to: cause the autonomous driving application to calculate the target track; subject the vehicle to automated travel in accordance with the target track calculated by the autonomous driving application; and calculate an evaluation value of performance of the autonomous driving application based on the information acquired by the travel state sensor. The first memory and the second memory may be separate memory devices, or may be different storage areas of an identical memory device.

The method provided by the present disclosure includes a method of evaluating performance of an autonomous driving device.

A third aspect of the present disclosure provides a method of evaluating, using a computer, performance of an autonomous driving device that calculates a target track for a vehicle, the method including: communicating with the autonomous driving device and subjecting the vehicle to automated travel in accordance with the target track received from the autonomous driving device; acquiring information about a travel state of the vehicle from a travel state sensor provided in the vehicle; and calculating an evaluation value of the performance of the autonomous driving device based on the information acquired from the travel state sensor. The computer may be mounted on the vehicle, or may be provided on a communication network and connected to the vehicle through wireless communication.

With the first vehicle and the method according to the present disclosure, an evaluation value of the performance of the autonomous driving device is calculated based on information acquired by the travel state sensor w % ben the vehicle is autonomously driven in accordance with the target track received from the autonomous driving device. This enables the subject that controls travel of the vehicle to grasp the performance of the autonomous driving device that is the subject that makes a travel plan for autonomous driving.

With the second vehicle according to the present disclosure, an evaluation value of the performance of the autonomous driving application is calculated based on information acquired by the travel state sensor when the vehicle is autonomously driven in accordance with the target track calculated by the autonomous driving application. This enables the subject that controls travel of the vehicle to grasp the performance of the autonomous driving application that is the subject that makes a travel plan for autonomous driving.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

1. First Embodiment 1-1. Configuration of Vehicle

A vehicle according to a first embodiment is an autonomous driving vehicle provided with a vehicle control system that achieves an autonomous driving level of Level 3 or higher according to the levels defined by the Society of Automotive Engineers (SAE), for example. The vehicle according to the first embodiment is suitable for a service operator that provides Mobility as a Service (MaaS). The configuration of the vehicle according to the first embodiment is illustrated in FIG. 1.

Figure 1:
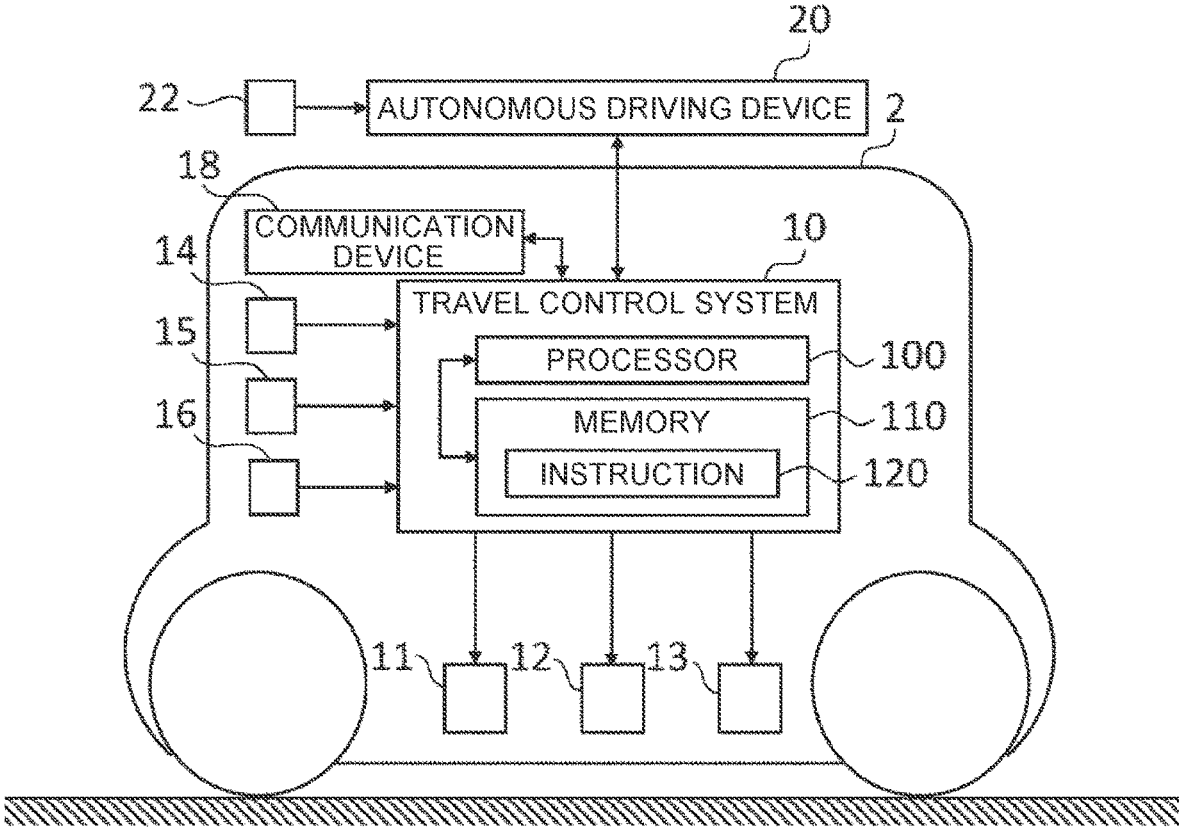
FIG. 1 illustrates the configuration of a vehicle according to a first embodiment of the present disclosure.

As illustrated in FIG. 1, a vehicle 2 according to the first embodiment includes a travel control system 10 and an autonomous driving device 20. The travel control system 10 and the autonomous driving device 20 constitute a vehicle control system that autonomously drives the vehicle 2. The travel control system 10 is mounted on the vehicle 2 in advance. The travel control system 10 is peculiar to the vehicle 2, and is provided from an automobile manufacturer together with the vehicle 2. On the other hand, the autonomous driving device 20 is an external computer that is removably mountable on the vehicle 2. Therefore, the autonomous driving device 20 can be designed and developed by a subject that is separate from that for the travel control system 10. In one example, the autonomous driving device 20 is prepared by a service operator that is the user of the vehicle 2.

The travel control system 10 includes one or more processors (hereinafter simply referred to as a "processor") 100 and a memory 110 connected to the processor 100. The processor 100 may be a central processing unit (CPU), a graphics processing unit (GPU), a field-programmable gate array (FPGA), or an application-specific integrated circuit (ASIC), for example. Alternatively, the processor 100 may be a combination of two or more of a CPU, a GPU, an FPGA, and an ASIC. The memory 110 stores a plurality of instructions (hereinafter the term "instruction" means a plurality of instructions) 120 that can be executed by the processor 100. The processor 100 reads the instruction 120 from the memory 110 to execute the instruction 120. When the instruction 120 stored in the memory 110 is executed by the processor 100, a variety of functions to be discussed later is provided to the travel control system 10.

The travel control system 10 is electrically connected to in-vehicle actuators through an in-vehicle network represented by a controller area network (CAN). The in-vehicle actuators are needed to cause the vehicle 2 to travel, and include a drive actuator 11 that drives the vehicle 2, a braking actuator 12 that brakes the vehicle 2, and a steering actuator 13 that steers the vehicle 2.

The travel control system 10 is electrically connected to in-vehicle sensors through the in-vehicle network. The in-vehicle sensors include a recognition sensor 14, a travel state sensor 15, and an external environment sensor 16. The recognition sensor 14 is typically a camera and a millimeter wave radar. The recognition sensor 14 is used to detect an obstacle that is present around, in particular ahead of, the vehicle 2, and measure the position and the speed of the detected obstacle relative to the vehicle 2. The travel state sensor 15 acquires information about the travel state of the vehicle 2. Examples of the travel state sensor 15 include a gravity (G) sensor that measures acceleration that acts on the vehicle 2 and a yaw rate sensor that measures the turning angular speed of the vehicle 2. The external environment sensor 16 acquires information about the external environment of the vehicle 2. Examples of the external environment sensor 16 include a raindrop sensor that outputs a signal that matches a rainfall and a temperature sensor that detects the temperature outside the vehicle. A thermistor that detects the substrate temperature of an in-vehicle camera may be used as the temperature sensor. In-vehicle sensors other than those described above may also be connected to the travel control system 10. The type and the specifications of the in-vehicle sensors are associated with the travel control system 10, unlike an ADK sensor to be discussed later.

Further, the travel control system 10 is electrically connected to a communication device 18 through the in-vehicle network. The communication device 18 allows the vehicle 2 to perform data communication with the outside. The communication device 18 is connectable to a communication network through wireless communication including LTE or 5G, for example.

The autonomous driving device 20 is independent of the vehicle 2 and removably mountable on the vehicle 2. The autonomous driving device 20 is connected to the travel control system 10 through a wire using a removable connector. Therefore, the autonomous driving device 20 is easily mountable on the vehicle 2, and the autonomous driving device 20 mounted on the vehicle 2 is easily replaceable. The vehicle 2 can be customized for individual service operators by simply replacing the autonomous driving device 20. The autonomous driving device 20 is also referred to as an autonomous driving kit (ADK).

The autonomous driving device 20 is electrically connected to the ADK sensor 22. The ADK sensor 22 is integrated with the autonomous driving device 20, or removably attached to the vehicle 2. The ADK sensor 22 is typically a LiDAR, a camera, or a global positioning system (GPS) sensor. The LiDAR and the camera are used to acquire information about the shape and the position of an object that is present around the vehicle 2. The GPS sensor is used to acquire information about the present position of the vehicle 2. In the present embodiment, the ADK sensor 22 is provided as a sensor exclusively for the autonomous driving device 20 that is electrically connected to only the autonomous driving device 20 and inputs acquired information to the autonomous driving device 20. Sensors other than those described above may also be connected to the autonomous driving device 20. The type and the specifications of the ADK sensor 22 connected to the autonomous driving device 20 may be uniquely determined by the user in accordance with the content of the service. For the service operator that is the user, it is possible to enhance the quality of the service that uses the vehicle 2 by preparing the ADK sensor 22 that is suitable for the service to be provided.

1-2. Configuration of Vehicle Control System

Figure 2:
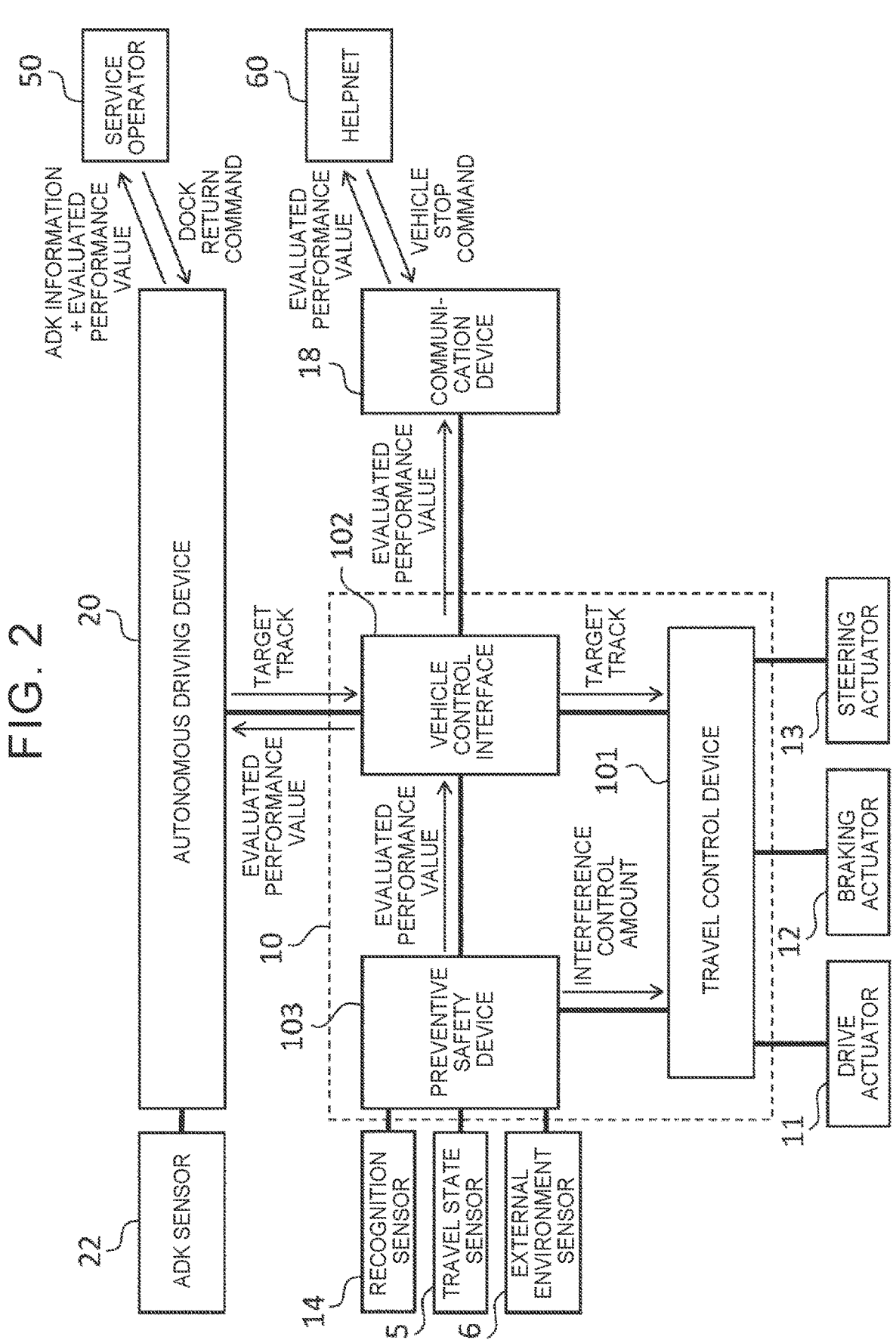
FIG. 2 illustrates an example of the configuration of a vehicle control system according to the first embodiment of the present disclosure.

Next, the configuration of the vehicle control system according to the first embodiment will be described. An example of the configuration of the vehicle control system according to the first embodiment can be represented in a block diagram such as that in FIG. 2. The vehicle control system is constituted by communicably connecting the travel control system 10 and the autonomous driving device 20.

The autonomous driving device 20 has a function to make a travel plan desired by the service operator that is the user. The autonomous driving device 20 calculates a target track to be traveled by the vehicle 2 based on the travel plan that has been made. The target track includes a line of dots that indicate target positions for the vehicle 2 in a coordinate system defined with reference to the vehicle 2, and a target speed or a target acceleration at each of the target positions. The target track is calculated using information obtained from the ADK sensor 22. The autonomous driving device 20 transmits the calculated target track to the travel control system 10. The autonomous driving device 20 calculates a target track and transmits the target track to the travel control system 10 in certain cycles.

The travel control system 10 includes a travel control device 101, a vehicle control interface 102, and a preventive safety device 103 communicably connected to each other. The devices 101, 102, and 103 may be constituted as independent computers, or may be constituted as software to be executed on a common computer. That is, in one configuration example, each of the travel control device 101, the vehicle control interface 102, and the preventive safety device 103 is constituted by a dedicated processor and an instruction to be executed by the dedicated processor. In another configuration example, the travel control device 101, the vehicle control interface 102, and the preventive safety device 103 are constituted by a common processor and an instruction to be executed on the common processor.

The travel control device 101 controls the actuators 11, 12, and 13 mounted on the vehicle 2 so as to cause the vehicle 2 to travel along the target track received from the autonomous driving device 20. More particularly, the travel control device 101 calculates a drive control amount to be provided to the drive actuator 11, a braking control amount to be provided to the braking actuator 12, and a steering control amount to be provided to the steering actuator 13 based on the target track and the present control state of the vehicle 2.

The preventive safety device 103 interferes with the travel control device 101 so as to suppress or avoid the occurrence of a collision between the vehicle 2 and an obstacle. The preventive safety device 103 calculates the possibility of a collision between the vehicle 2 and an obstacle that is present ahead of the vehicle 2 based on information from the recognition sensor 14 and the travel state sensor 15. For example, the preventive safety device 103 calculates a time (TTC) until a collision based on the distance from the vehicle 2 to an obstacle and the relative speed, and interferes with the travel control device 101 when the TTC becomes a threshold or less. The preventive safety device 103 interferes with the travel control device 101 by providing an interference control amount to the travel control device 101. The interference control amount includes at least one of the drive control amount, the braking control amount, and the steering control amount. When the interference control amount is provided from the preventive safety device 103 to the travel control device 101, the travel control device 101 gives a priority to the interference control amount over the control amounts calculated from the target track, and controls the actuators 11, 12, and 13 in accordance with the interference control amount.

Detection of an obstacle that is present ahead of the vehicle 2 is also performed by the autonomous driving device 20 based on information from the ADK sensor 22. The autonomous driving device 20 calculates a target track so as to avoid a collision with an obstacle. Therefore, theoretically, a collision with an obstacle should not occur if the control amounts are determined in accordance with the target track received from the autonomous driving device 20. However, the autonomous driving device 20 is designed and developed separately from the travel control system 10, and is not necessarily optimized for the motion performance of the vehicle 2. Meanwhile, the performance of the autonomous driving device 20 related to autonomous driving may be constantly or temporarily degraded by the occurrence of a certain abnormality. For these reasons, the target track received from the autonomous driving device 20 is not always ideal. Therefore, the preventive safety device 103 occasionally operates to finally suppress or avoid the occurrence of a collision with an obstacle.

The timing when the preventive safety device 103 interferes with the travel control device 101 depends on the precision of the target track received from the autonomous driving device 20. In an example in which the preventive safety device 103 interferes with the travel control device 101 when the TTC becomes a threshold or less, the threshold may be increased when the precision of the target track is low. Since the autonomous driving device 20 is uniquely prepared by the service operator, however, information about the precision of the target track, that is, the level of the performance of the autonomous driving device 20 related to autonomous driving, is not always shared with the travel control system 10.

Even if information about the precision of the target track is not provided from the autonomous driving device 20, it is important to grasp such information from the viewpoint of preventive safety. Thus, the preventive safety device 103 is provided with a function as a performance evaluation device that evaluates the performance of the autonomous driving device 20 related to autonomous driving. When the performance of the autonomous driving device 20 is mentioned hereinafter, the performance of the autonomous driving device 20 related to autonomous driving is meant. The preventive safety device 103 evaluates the performance of the autonomous driving device 20 based on travel state information obtained from the travel state sensor 15 and external environment information obtained from the external environment sensor 16. In evaluating the performance, as discussed in detail later, an evaluated performance value obtained by digitalizing evaluation results is calculated. The preventive safety device 103 varies the level of interference with the travel control device 101 in accordance with the calculated evaluated performance value. The preventive safety device 103 transmits the evaluated performance value to the vehicle control interface 102.

The vehicle control interface 102 is used when the travel control system 10 exchanges information with the outside. The target track transmitted from the autonomous driving device 20 is received through the vehicle control interface 102. The vehicle control interface 102 transfers the received target track to the travel control device 101. In addition, the vehicle control interface 102 transfers an evaluated performance value input from the preventive safety device 103 to the autonomous driving device 20. The evaluated performance value reflects the result of the vehicle 2 traveling in accordance with the target track. Hence, the evaluated performance value is considered as information that is useful for the autonomous driving device 20, more specifically for a service operator 50 that prepared the autonomous driving device 20.

Further, the vehicle control interface 102 transmits the evaluated performance value to a helpnet 60 via the communication device 18. The helpnet 60 is a management center for emergency response operated by a business operator that provides the vehicle 2 to the service operator 50 and maintains the vehicle 2, e.g. a vehicle manufacturer. In the helpnet 60, emergency response may be handled by an operator, or may be automatically handled by a server. When the communication device 18 receives a vehicle stop command from the helpnet 60, the vehicle stop command is input to the vehicle control interface 102.

When the evaluated performance value is received from the travel control system 10, the autonomous driving device 20 records the received evaluated performance value in an internal memory. In addition, the autonomous driving device 20 transmits the evaluated performance value to the service operator 50 together with ADK information that includes the diagnosis result of a self-diagnosis made by the autonomous driving device 20 itself, either upon each reception of an evaluated performance value or regularly in accordance with a schedule determined in advance. A dock return command is occasionally transmitted from the service operator 50 to the autonomous driving device 20, depending on information transmitted from the autonomous driving device 20 to the service operator 50. In that case, the autonomous driving device 20 changes the travel plan so as to return the vehicle 2 to the dock, and calculates a target track based on the changed travel plan. The autonomous driving device 20 is provided with a communication device that allows the autonomous driving device 20 to communicate with the service operator 50. However, the communication device 18 mounted on the vehicle 2 may be used to communicate with the service operator 50.

1-3. Method of Evaluating Performance of Autonomous Driving Device

Figure 3:
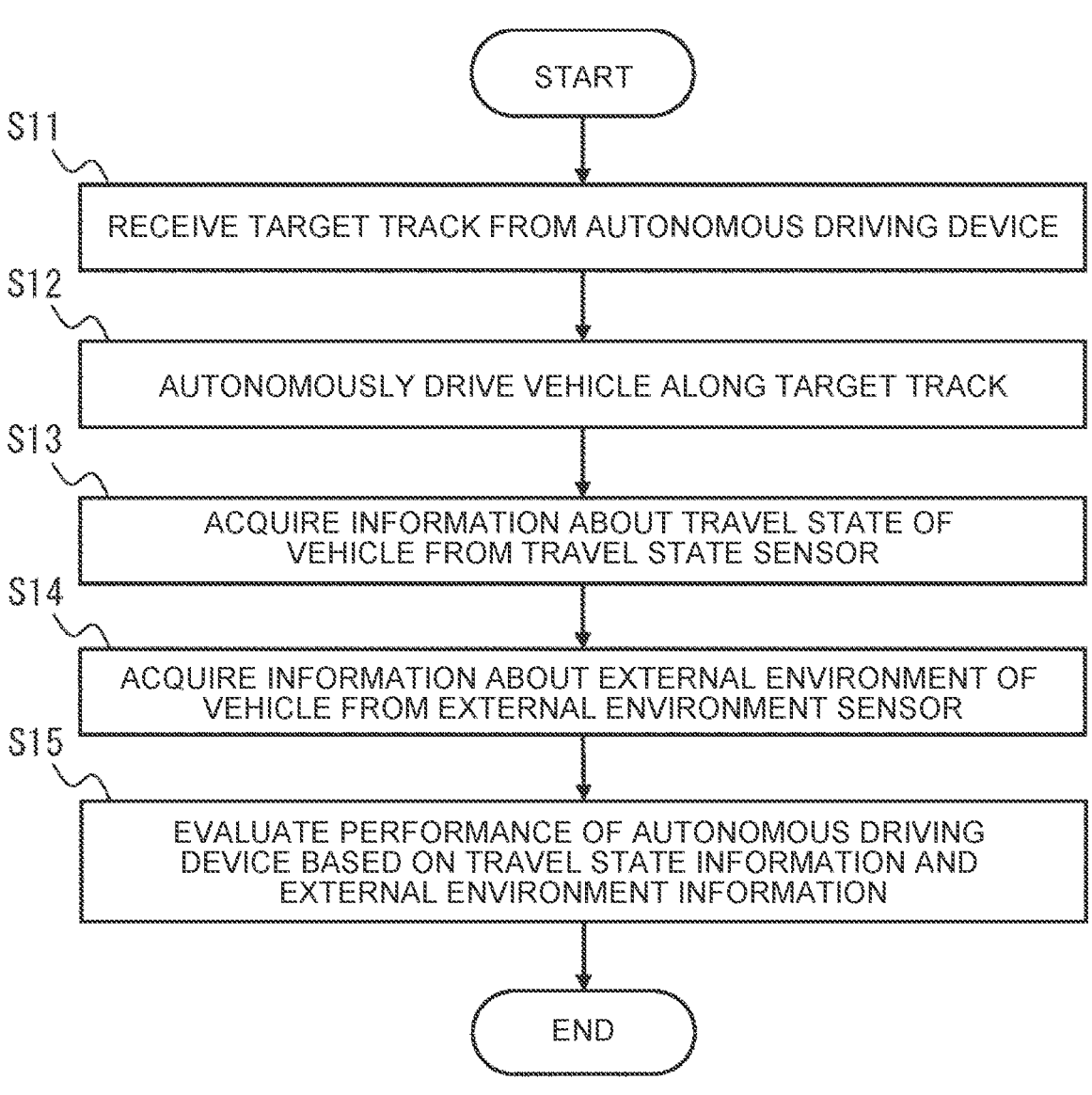
FIG. 3 is a flowchart illustrating the procedures of a method of evaluating the performance of an autonomous driving device according to the first embodiment of the present disclosure.

Next, a method of evaluating the autonomous driving device 20 according to the first embodiment will be described. FIG. 3 is a flowchart illustrating the procedures of a method of evaluating the performance of the autonomous driving device 20. The method of evaluating the autonomous driving device 20 is repeatedly performed in certain cycles by the travel control system 10 in accordance with the procedures illustrated in the flowchart.

First, the travel control system 10 executes step S11. In step S11, a target track is received from the autonomous driving device 20. The target track is received by the vehicle control interface 102, and transferred to the travel control device 101.

Next, the travel control system 10 executes step S12. In step S12, the vehicle 2 is autonomously driven in accordance with the target track received from the autonomous driving device 20. The control amounts for the actuators 11, 12, and 13 for autonomously driving the vehicle 2 are calculated by the travel control device 101 based on the target track.

Next, the travel control system 10 executes step S13. In step S13, information about the travel state of the vehicle 2 is acquired from the travel state sensor 15. Travel state information acquired from the travel state sensor 15 is input to the preventive safety device 103 as the performance evaluation device.

Next, the travel control system 10 executes step S14. In step S14, information about the external environment of the vehicle 2 is acquired from the external environment sensor 16. External environment information acquired from the external environment sensor 16 is input to the preventive safety device 103 as the performance evaluation device. Step S14 may be executed before step S13, or may be executed concurrently with step S13.

Finally, the travel control system 10 executes step S15. In step S15, the performance of the autonomous driving device 20 is evaluated based on the travel state information and the external environment information. The preventive safety device 103 as the performance evaluation device calculates an evaluated performance value obtained by digitalizing the performance of the autonomous driving device 20 based on the travel state information and the external environment information.

Figure 4:
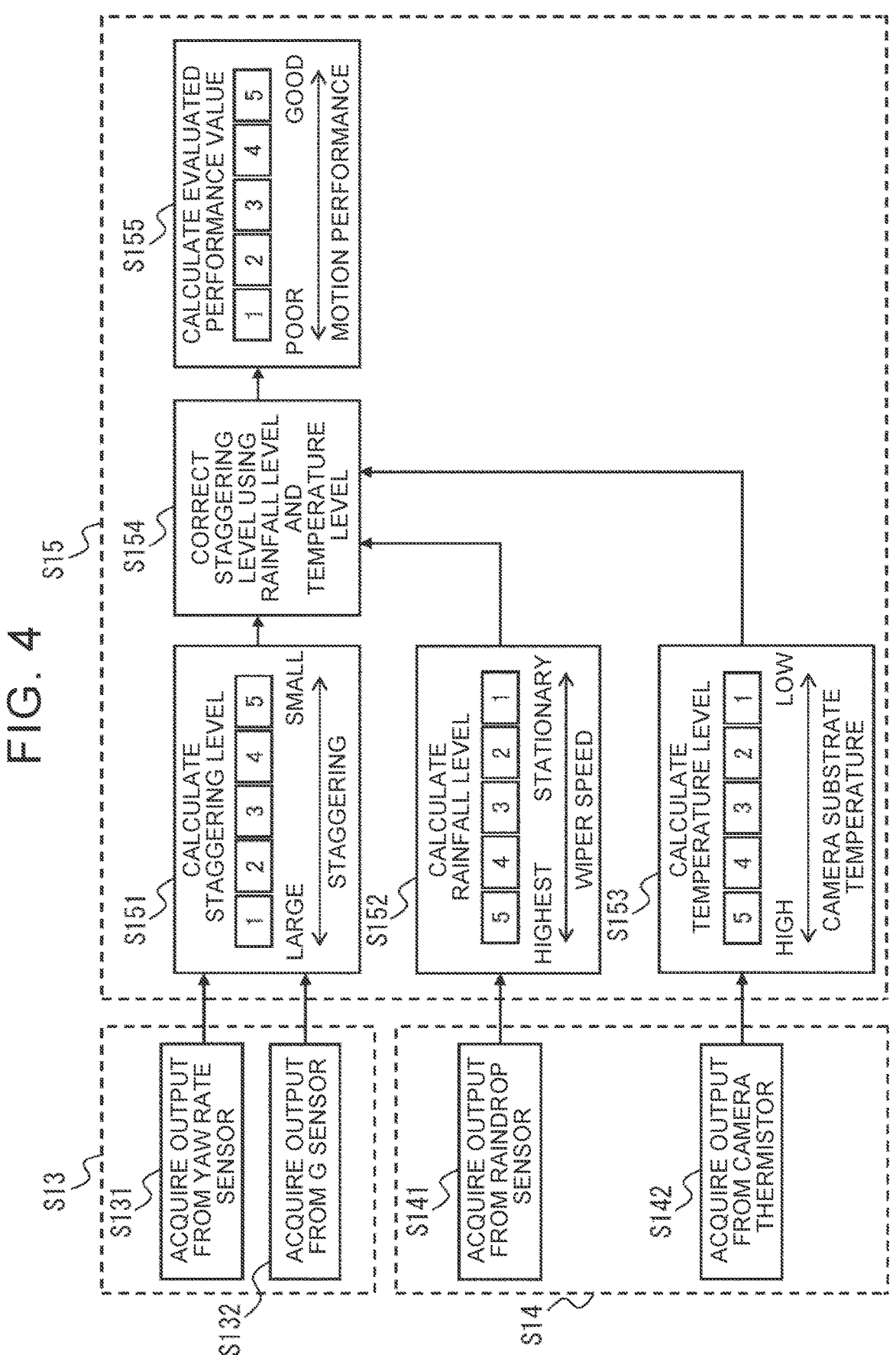
FIG. 4 is a flowchart illustrating the details of the procedures of calculation of an evaluated performance value according to the first embodiment of the present disclosure.

The procedures of calculation of an evaluated performance value by the preventive safety device 103 can be described with reference to FIG. 4. FIG. 4 is a flowchart illustrating the procedures of calculation of an evaluated performance value performed by the preventive safety device 103.

Step S13 in which the preventive safety device 103 acquires travel state information from the travel state sensor 15 includes steps S131 and S132. In step S131, an output of the yaw rate sensor, that is, the angular speed of rotation of the vehicle 2, is acquired. In step S132, an output of the G sensor, that is, the acceleration of the vehicle 2, is acquired.

Step S14 in which the preventive safety device 103 acquired external environment information from the external environment sensor 16 includes steps S141 and S142. In step S141, an output of the raindrop sensor, or the wiper speed of au automatic wiper that varies in accordance with an output of the raindrop sensor to be more exact, is acquired. In step S142, an output of the camera thermistor of the in-vehicle camera, that is, the substrate temperature of the in-vehicle camera, is acquired.

Step S15 in which the preventive safety device 103 calculates an evaluated performance value includes steps S151, S152, S153, S154, and S155. In step S151, the staggering level of the vehicle 2 is calculated. The staggering level is calculated using the angular speed of rotation acquired in step S131 and the acceleration acquired in step S132. The preventive safety device 103 calculates and summarizes the number of times when the angular speed of rotation exceeds a threshold, the degree by which the threshold is exceeded, and the frequency at which the threshold is exceeded, and calculates and summarizes the number of times when the acceleration exceeds a threshold, the degree by which the threshold is exceeded, and the frequency at which the threshold is exceeded. Then, the preventive safety device 103 calculates an average value of the summarization result for a predetermined time (e.g. 1 minute) in the past, and categorizes the calculated value of the summarization result into one of five levels defined in advance. In the example illustrated in FIG. 4, the staggering is largest in level 1, and the staggering is smallest in level 5.

In step S152, the rainfall level is calculated. When it is raining, the camera or the LiDAR of the ADK sensor 22 may be soiled. Soil on the camera or the LiDAR lowers the precision in recognition, and hence lowers the precision of a target track. The rainfall level is used as an index for predicting a reduction in the precision of a target track due to soil on the camera or the LiDAR. The rainfall level is calculated using the wiper speed of the automatic wiper acquired in S141. The preventive safety device 103 categorizes the wiper speed of the automatic wiper into one of five levels defined in advance. In the example illustrated in FIG.

4, the highest wiper speed is categorized into level 5, and the wiper is stationary in level 1.

In step S153, the temperature level is calculated. At high temperatures, the recognition performance of the autonomous driving device 20 may be lowered with operation of the camera of the ADK sensor 22 stopped. The temperature level is used as an index for predicting a reduction in the precision of a target track due to stop of operation the camera of the ADK sensor 22. The temperature level is calculated using the temperature of the in-vehicle camera acquired in step S142. Although the travel control system 10 cannot acquire the temperature of the camera of the ADK sensor 22, it is estimated that the camera of the ADK sensor 22 is also at a high temperature when the in-vehicle camera is at a high temperature. The preventive safety device 103 categorizes the substrate temperature of the in-vehicle camera into five levels defined in advance. In the example illustrated in FIG. 4, the temperature is highest in level 5, and the temperature is lowest in level 1.

In step S154, the staggering level calculated in step S151 is corrected using the rainfall level calculated in step S152 and the temperature level calculated in step S153. The staggering level is the basic value of the evaluated performance value. When staggering of the vehicle 2 autonomously driven in accordance with a target track is large, it can be estimated that the cause of the staggering is low precision of the target track. However, the precision of the target track is affected by not only the performance of the autonomous driving device 20 but also soil on the camera or the LiDAR due to rainfall and stopping of operation of the camera due to a high temperature. In step S154, a staggering level that reflects only the performance of the autonomous driving device 20 is calculated by eliminating the effect of such disturbance factors. For example, the rainfall level and the temperature level may be multiplied by respective coefficients and added to the staggering level so that the resulting level is used as a corrected staggering level.

In step S155, an evaluated performance value is calculated from the staggering level corrected in step S154. The preventive safety device 103 classifies the corrected staggering level into five numerical values of 1 to 5. In the example illustrated in FIG. 4, the numerical value 5 is given when the motion performance is evaluated as good, and the numerical value 1 is given when the motion performance is evaluated as poor. For example, the evaluated performance value is determined as 1 when the staggering level before the correction is 1 and both the rainfall level and the temperature level are 1. This means that the staggering is due to the performance of the autonomous driving device 20, and that the performance of the autonomous driving device 20 is evaluated as low. On the other hand, the evaluated performance value is determined as 3 when the rainfall level is 5, even if the staggering level before the correction is 1. This means that the staggering is partly due to soil on the ADK sensor 22 due to rainfall, and that the performance of the autonomous driving device 20 itself is evaluated as ordinary.

The evaluated performance value calculated as described above is referenced to determine the interference level at which the preventive safety device 103 interferes with the travel control device 101, and transmitted to the autonomous driving device 20 as reference information. The evaluated performance value is also used as an index for determining vehicle stop executed when safety cannot be secured even with interference by the preventive safety device 103.

Figure 5:
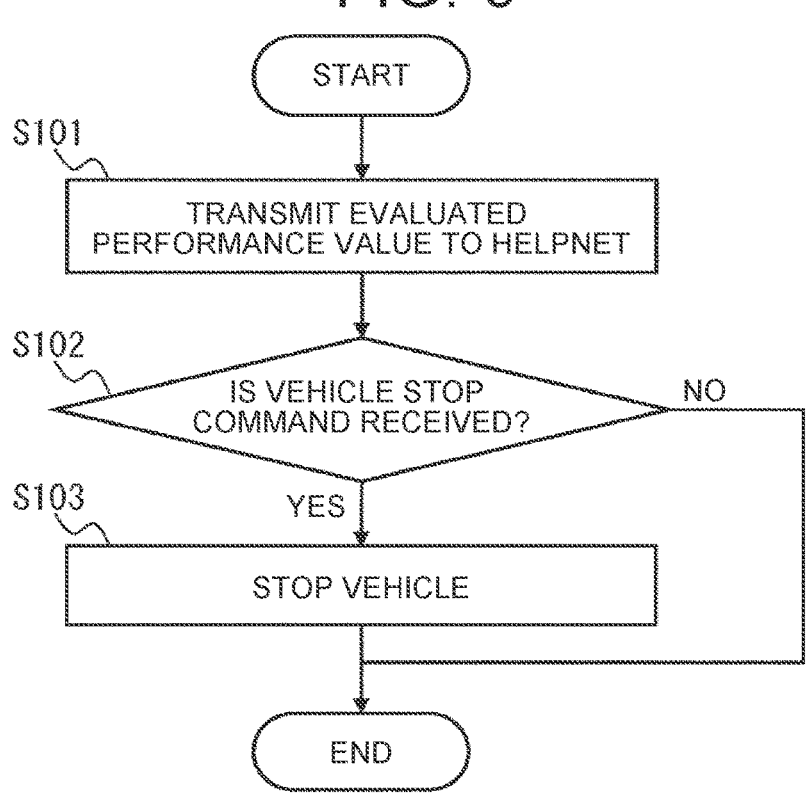
FIG. 5 is a flowchart illustrating the procedures of vehicle stop control according to the first embodiment of the present disclosure.

The procedures of vehicle stop control by the travel control system 10 can be described with reference to FIG. 5. FIG. 5 is a flowchart illustrating the procedures of vehicle stop control based on the evaluated performance value performed by the travel control system 10.

In step S101, an evaluated performance value is transmitted to the helpnet 60 via the communication device 18. When the evaluated performance value is equal to or less than a threshold, the helpnet 60 determines that safety cannot be secured if the vehicle 2 is kept traveling through autonomous driving, and transmits a vehicle stop command to the vehicle 2.

In step S102, it is determined whether a vehicle stop command has been received. When a vehicle stop command is received by the communication device 18, the received vehicle stop command is input to the travel control device 101 by way of the vehicle control interface 102. The next step is skipped until a vehicle stop command is received.

Step S103 is executed when a vehicle stop command is received. When a vehicle stop command is input to the travel control device 101, the travel control device 101 gives a priority to the vehicle stop command over the control amounts calculated from the target track, and controls the actuators 11, 12, and 13 in accordance with the vehicle stop command.

1-4. Modifications

There are several modifications of the first embodiment discussed above. For example, a dedicated sensor such as the ADK sensor 22 may not be provided, and information from the recognition sensor 14 mounted on the vehicle 2 may be transmitted to the autonomous driving device 20 by way of the vehicle control interface 102. In that case, the autonomous driving device 20 may calculate a target track based on the information from the recognition sensor 14.

The autonomous driving device 20 and the travel control system 10 may be connected to each other through wireless communication. That is, the autonomous driving device 20 may be disposed on a communication network including the Internet, rather than being mounted on the vehicle 2. For example, a server of the service operator 50 or a cloud server may be constituted as the autonomous driving device 20, and a target track calculated by such a server may be provided to the vehicle 2 through wireless communication. Information needed to calculate a target track may be transmitted from the vehicle 2 to the server as the autonomous driving device 20. In this case, a dedicated ADK sensor 22 may be removably attached to the vehicle 2, or a sensor originally mounted on the vehicle 2, including the recognition sensor 14, may be used.

In addition, a rainfall level and a temperature level calculated to calculate an evaluated performance value may be transmitted to the autonomous driving device 20 together with the evaluated performance value. The autonomous driving device 20 can reflect the rainfall level in the calculation of a target track. The autonomous driving device 20 can also transmit the rainfall level and the temperature level to the service operator 50 in addition to the evaluated performance value. The service operator 50 can reference the rainfall level and the temperature level as determination materials for determining whether to return the vehicle 2 to the dock. When the temperature level is high, the service operator 50 can provide the autonomous driving device 20 with a command to stop the vehicle 2 in the shade.

2. Second Embodiment 2-1. Configuration of Vehicle

The vehicle according to the first embodiment and a vehicle according to a second embodiment are different in the subject that makes a travel plan for autonomous driving.

Figure 6:
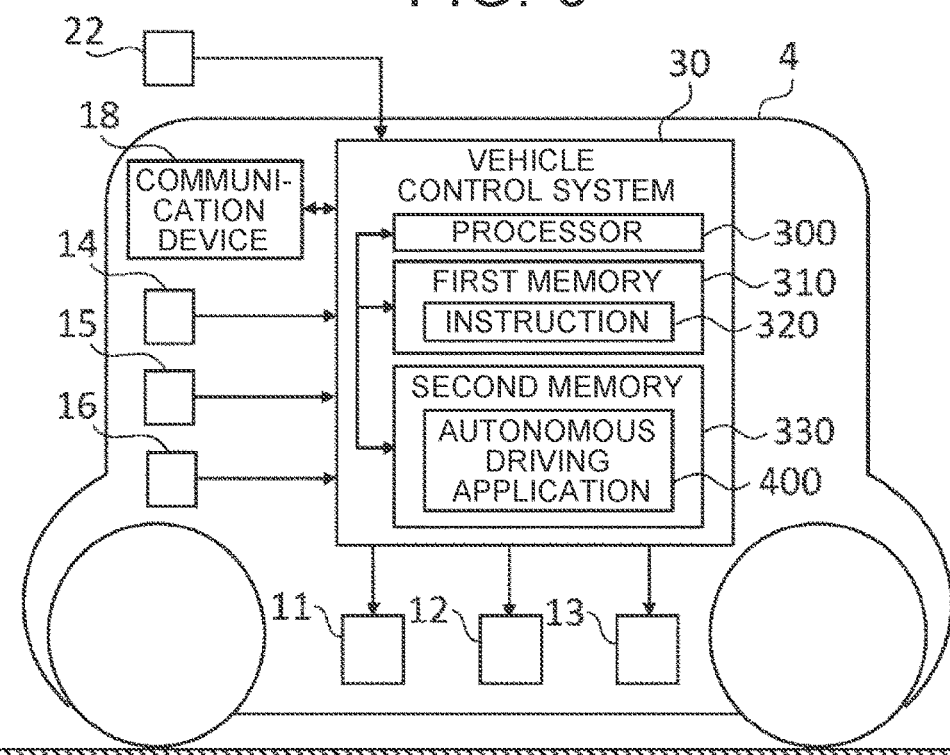
FIG. 6 illustrates the configuration of a vehicle according to a second embodiment of the present disclosure.

While the subject that makes a travel plan for autonomous driving for the vehicle according to the first embodiment is the autonomous driving device, the subject that makes a travel plan for autonomous driving for the vehicle according to the second embodiment is an autonomous driving application. The configuration of the vehicle according to the second embodiment is illustrated in FIG. 6. In FIG. 6, the same elements as those of the vehicle according to the first embodiment are denoted by like signs.

As illustrated in FIG. 6, a vehicle 4 according to the second embodiment includes a vehicle control system 30. The vehicle control system 30 is provided with both the function of the travel control system 10 and the function of the autonomous driving device 20 according to the first embodiment. The vehicle control system 30 is mounted on the vehicle 4 in advance.

The vehicle control system 30 is electrically connected to the drive actuator 11, the braking actuator 12, and the steering actuator 13 through an in-vehicle network. The vehicle control system 30 is also electrically connected to the recognition sensor 14, the travel state sensor 15, and the external environment sensor 16 through the in-vehicle network. The vehicle control system 30 is further electrically connected to the communication device 18 through the in-vehicle network.

The vehicle control system 30 includes one or more processors (hereinafter simply referred to as a "processor") 300 and a first memory 310 connected to the processor 300. The processor 300 may be a CPU, a GPU, an FPGA, or an ASIC, for example. Alternatively, the processor 300 may be a combination of two or more of a CPU, a GPU, an FPGA, and an ASIC. The first memory 310 stores a plurality of instructions (hereinafter the term "instruction" means a plurality of instructions) 320 that can be executed by the processor 300. The processor 300 reads the instruction 320 from the first memory 310 to execute the instruction 320. When the instruction 320 stored in the first memory 310 is executed by the processor 300, a variety of functions to be discussed later is provided to the vehicle control system 30.

The vehicle control system 30 further includes a second memory 330 connected to the processor 300. The second memory 330 stores an autonomous driving application 400 that can be executed by the processor 300. The autonomous driving application 400 provides the vehicle control system 30 with an autonomous driving function when executed by the processor 300. The first memory 310 and the second memory 330 may be separate memory devices, or may be different storage areas of an identical memory device. The second memory 330 is a rewritable memory.

The autonomous driving application 400 can be designed and developed by a subject that is separate from that for the vehicle control system 30. In one example, the autonomous driving application 400 is prepared by a service operator that is the user of the vehicle 4. The autonomous driving application 400 can be stored in the second memory 330 by downloading the autonomous driving application 400 from a server via the communication device 18. The autonomous driving application 400 may be installed in the vehicle control system 30 by connecting a storage that stores the autonomous driving application 400 to the vehicle control system 30. The vehicle 4 can be customized for individual service operators by simply rewriting the autonomous driving application 400 to be stored in the second memory 330.

The vehicle control system 30 is electrically connected to the ADK sensor 22 removably attached to the vehicle 4. The ADK sensor 22 is provided exclusively for the autonomous driving application 400, and information acquired by the ADK sensor 22 is used by only the autonomous driving application 400. The ADK sensor 22 is prepared by the service operator together with the autonomous driving application 400.

2-2. Configuration of Vehicle Control System

Next, the configuration of the vehicle control system according to the second embodiment will be described. One example of the configuration of the vehicle control system according to the second embodiment can be represented in a layer diagram such as that in FIG. 7.

All the functions of the vehicle control system 30 according to the second embodiment are implemented by software. The functions implemented by software include a travel control function, a preventive safety function, a target track calculation function, and a performance evaluation function. The travel control function corresponds to the function of the travel control device 101 according to the first embodiment. The preventive safety function corresponds to the function of the preventive safety device 103 according to the first embodiment. The target track calculation function corresponds to the function of the autonomous driving device 20 according to the first embodiment. The performance evaluation function corresponds to the function of the preventive safety device 103 as the performance evaluation device according to the first embodiment.

Figure 7:
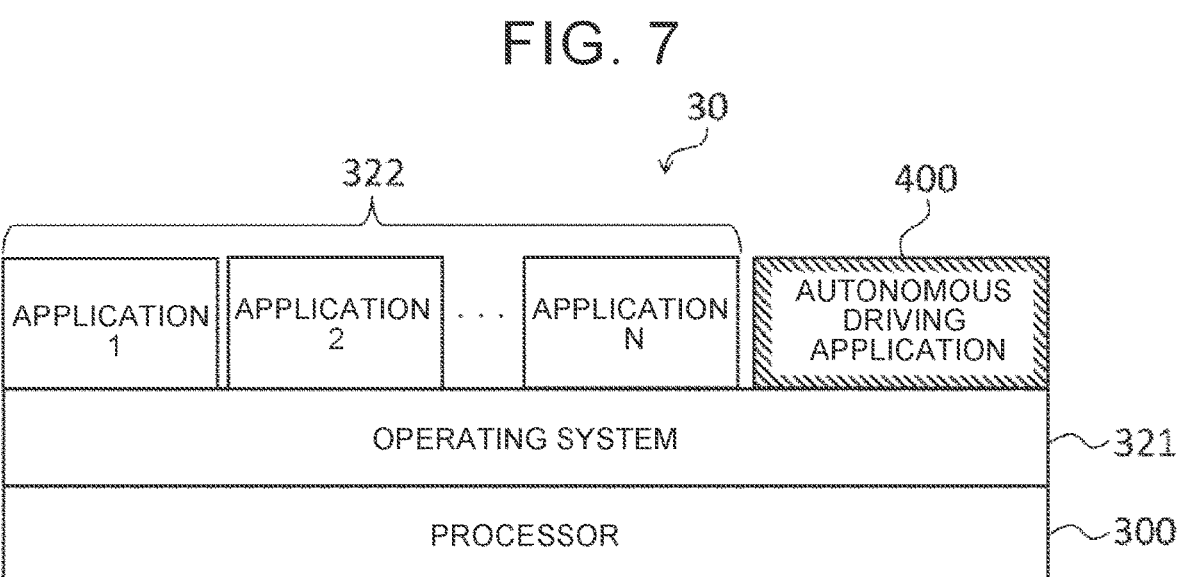
FIG. 7 illustrates the configuration of a vehicle control system according to the second embodiment of the present disclosure.

As illustrated in FIG. 7, the vehicle control system 30 has a layered structure composed of a physical layer, an intermediate layer, and an application layer. The physical layer is composed of the processor 300. The intermediate layer is composed of an operating system 321 that operates on the processor 300. The application layer includes a plurality of applications 322 and 400 that operates on the operating system 321. The functions discussed above are implemented by the applications 322 and 400.

Among the applications 322 and 400 with the functions discussed above, the application 322 is stored in the first memory 310. The application 322 stored in the first memory 310 includes a travel control application with the travel control function, a preventive safety application with the preventive safety function, and a performance evaluation application with the performance evaluation function. An instruction that constitutes the application 322 constitutes the instruction 320 stored in the first memory 310 together with an instruction that constitutes the operating system 321.

The autonomous driving application 400 is stored in the second memory 330. The target track calculation function is provided by the autonomous driving application 400. The autonomous driving application 400 makes a travel plan desired by the service operator that is the user, and calculates a target track to be traveled by the vehicle 4 based on the travel plan that has been made. The autonomous driving application 400 is rewritable independently of other applications.

2-3. Method of Evaluating Performance of Autonomous Driving Application

Figure 8:
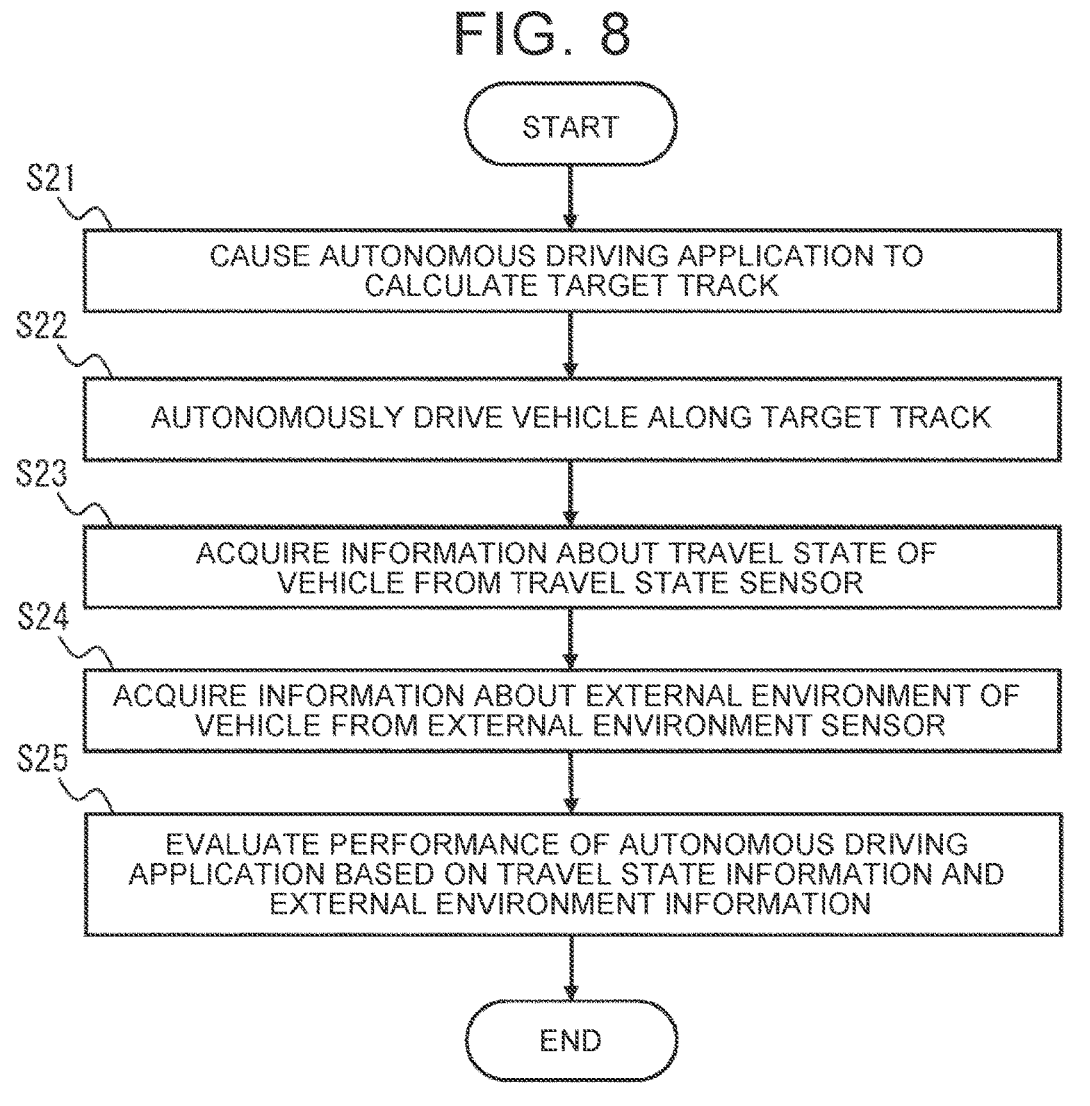
FIG. 8 is a flowchart illustrating the procedures of a method of evaluating the performance of an autonomous driving application according to the second embodiment of the present disclosure.

Next, a method of evaluating the autonomous driving application 400 according to the second embodiment will be described. FIG. 8 is a flowchart illustrating the procedures of a method of evaluating the autonomous driving application 400. The method of evaluating the autonomous driving application 400 is repeatedly performed in certain cycles by the vehicle control system 30 in accordance with the procedures illustrated in the flowchart. More particularly, the autonomous driving application 400 is evaluated in accordance with the procedures illustrated in the flowchart by the processor 300 executing the performance evaluation application.

First, the vehicle control system 30 executes step S21. In step S21, the autonomous driving application 400 is caused to calculate a target track.

Next, the vehicle control system 30 executes step S22. In step S22, the vehicle 4 is autonomously driven in accordance with the target track calculated by the autonomous driving application 400. The control amounts for the actuators 11, 12, and 13 for autonomously driving the vehicle 4 are calculated by the travel control application based on the target track.

Next, the vehicle control system 30 executes step S23. In step S23, information about the travel state of the vehicle 4 is acquired from the travel state sensor 15. Travel state information acquired from the travel state sensor 15 is temporarily stored in one of the memories.

Next, the vehicle control system 30 executes step S24. In step S24, information about the external environment of the vehicle 4 is acquired from the external environment sensor 16. External environment information acquired from the external environment sensor 16 is temporarily stored in one of the memories. Step S24 may be executed before step S23, or may be executed concurrently with step S23.

Finally, the vehicle control system 30 executes step S25. In step S25, the performance of the autonomous driving application 400 is evaluated based on the travel state information and the external environment information. The performance evaluation application calculates an evaluated performance value obtained by digitalizing the performance of the autonomous driving application 400 based on the travel state information and the external environment information. The method of calculating an evaluated performance value for the autonomous driving device 200 described in relation to the first embodiment can be applied for the method of calculating an evaluated performance value for the autonomous driving application 400.

2-4. Modifications

There are several modifications of the second embodiment discussed above. For example, an operating system may be provided for each application, or for each application group that includes a plurality of applications, in the layered structure illustrated in FIG. 7.

A dedicated sensor such as the ADK sensor 22 may not be provided, and information from the recognition sensor 14 mounted on the vehicle 4 may be used by the autonomous driving application 400.

What is claimed is:

1. A vehicle comprising:
a travel state sensor configured to acquire information about a travel state of the vehicle;
one or more processors; and
a memory connected to the one or more processors and storing a plurality of instructions to be executed by the one or more processors, wherein the instructions are configured to cause the one or more processors to
communicate with an autonomous driving device configured to calculate a target track for the vehicle,
subject the vehicle to automated travel in accordance with the target track received from the autonomous driving device, and
calculate an evaluation value of performance of the autonomous driving device based on the information acquired by the travel state sensor, wherein:
the evaluation value relates to a past motion performance of the vehicle when the vehicle was driving automatically in accordance with the target track, the autonomous driving device that makes a travel plan for autonomous driving is independent of the one or more processors that control travel of the vehicle, and the evaluation value enables the one or more processors that control travel of the vehicle to evaluate the performance of the autonomous driving device that makes the travel plan for the autonomous driving.

2. The vehicle according to claim 1, wherein the instructions are configured to cause the one or more processors to transmit the evaluation value to the autonomous driving device.

3. The vehicle according to claim 1, further comprising a communication device configured to wirelessly communicate with a management center that is external to the vehicle, wherein the instructions are configured to cause the one or more processors to transmit the evaluation value to the management center via the communication device.

4. The vehicle according to claim 3, wherein the instructions are configured to cause the one or more processors to stop the vehicle in response to a vehicle stop command from the management center input via the communication device.

5. The vehicle according to claim 1, wherein the instructions are configured to cause the one or more processors to interfere with the automated travel in accordance with the evaluation value.

6. The vehicle according to claim 1, further comprising an external environment sensor configured to acquire information about an external environment of the vehicle, wherein the instructions are configured to cause the one or more processors to correct the evaluation value based on the information acquired by the external environment sensor.

7. The vehicle according to claim 6, wherein:

the external environment sensor is a raindrop sensor configured to output a signal that matches a rainfall; and the instructions are configured to cause the one or more processors to correct the evaluation value based on a rainfall level acquired by the raindrop sensor.

8. The vehicle according to claim 6, wherein:

the external environment sensor is a temperature sensor configured to detect a substrate temperature of an in-vehicle camera; and the instructions are configured to cause the one or more processors to correct the evaluation value based on a temperature level of the substrate temperature acquired from the in-vehicle camera.

9. A vehicle comprising:

a travel state sensor configured to acquire information about a travel state of the vehicle;

one or more processors;

a first memory connected to the one or more processors and storing a plurality of instructions that is executable by the one or more processors; and a second memory connected to the one or more processors and storing an autonomous driving application that calculates a target track for the vehicle, wherein the instructions are configured to cause the one or more processors to cause the autonomous driving application to calculate the target track, subject the vehicle to automated travel in accordance with the target track calculated by the autonomous driving application, and calculate an evaluation value of performance of the autonomous driving application based on the information acquired by the travel state sensor, wherein:

the evaluation value relates to a past motion performance of the vehicle when the vehicle was driving automatically in accordance with the target track, the autonomous driving application that makes a travel plan for autonomous driving is independent of the plurality of instructions that is executable by the one or more processors that control travel of the vehicle, and the evaluation value enables the one or more processors that control travel of the vehicle to evaluate the performance of the autonomous driving application that makes the travel plan for the autonomous driving.

10. A method of evaluating, using a computer, performance of an autonomous driving device configured to calculate a target track for a vehicle, the method comprising:

communicating with the autonomous driving device and subjecting the vehicle to automated travel in accordance with the target track received from the autonomous driving device;

acquiring information about a travel state of the vehicle from a travel state sensor provided in the vehicle; and calculating an evaluation value of the performance of the autonomous driving device based on the information acquired from the travel state sensor, wherein:

the evaluation value relates to a past motion performance of the vehicle when the vehicle was driving automatically in accordance with the target track, the autonomous driving device that makes a travel plan for autonomous driving is independent of the computer that controls travel of the vehicle, and the evaluation value enables the computer that controls travel of the vehicle to evaluate the performance of the autonomous driving device that makes the travel plan for the autonomous driving.

* * * * *